(12) United States Patent
Barbiero et al.

(10) Patent No.: US 10,936,530 B2
(45) Date of Patent: Mar. 2, 2021

(54) METHOD AND APPARATUS FOR DETERMINING LINK BIFURCATION AVAILABILITY

(71) Applicant: ATI Technologies ULC, Markham (CA)

(72) Inventors: Natale Barbiero, Markham (CA); Gordon Caruk, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 16/521,562

(22) Filed: Jul. 24, 2019

(65) Prior Publication Data

US 2021/0026797 A1 Jan. 28, 2021

(51) Int. Cl.
*G06F 13/42* (2006.01)
*G06F 13/20* (2006.01)

(52) U.S. Cl.
CPC .......... *G06F 13/4282* (2013.01); *G06F 13/20* (2013.01); *G06F 2213/0026* (2013.01)

(58) Field of Classification Search
None
See application file for complete search history.

(56) References Cited

U.S. PATENT DOCUMENTS

| 7,756,123 B1 * | 7/2010 | Huang | G06F 13/4022 370/359 |
| 9,043,526 B2 | 5/2015 | Freking et al. | |
| 2016/0041935 A1 * | 2/2016 | Kinjo | G06F 13/4022 710/116 |

* cited by examiner

*Primary Examiner* — Farley Abad
*Assistant Examiner* — Dayton Lewis-Taylor
(74) *Attorney, Agent, or Firm* — Volpe Koenig, P.C.

(57) ABSTRACT

A method and apparatus for determining link bifurcation availability implemented in a computer system includes assigning, by a controller, lanes that include links for one or more components connected in accordance with a current known configuration. The controller transmits ordered sets including the assignments to the one or more components which are received by the one or more components. The one or more components respond with a first link to the controller. Based upon the links received by the controller not meeting the current known configuration, the controller issues an interrupt and is reconfigured.

24 Claims, 3 Drawing Sheets

METHOD AND APPARATUS FOR DETERMINING LINK BIFURCATION AVAILABILITY

BACKGROUND

Peripheral Component Interconnect Express (PCIe) controllers may be deployed in a default configuration where less than the ideal number of ports are enabled. Software programs then use information available after establishing the PCIe links on the ports that are available to determine what the ideal PCIe controller configuration is. For example, a configuration may be stored off-chip and the information is only communicated after the link is negotiated and in an active state. A complete reset and reconfiguration of the PCIe controller and other affected devices must then be triggered in order to have the correct configuration implemented. This mechanism could take on the order of seconds to determine the ideal configuration, slowing overall processing ability.

BRIEF DESCRIPTION OF THE DRAWINGS

A more detailed understanding can be had from the following description, given by way of example in conjunction with the accompanying drawings wherein.

DETAILED DESCRIPTION

Figure 1:
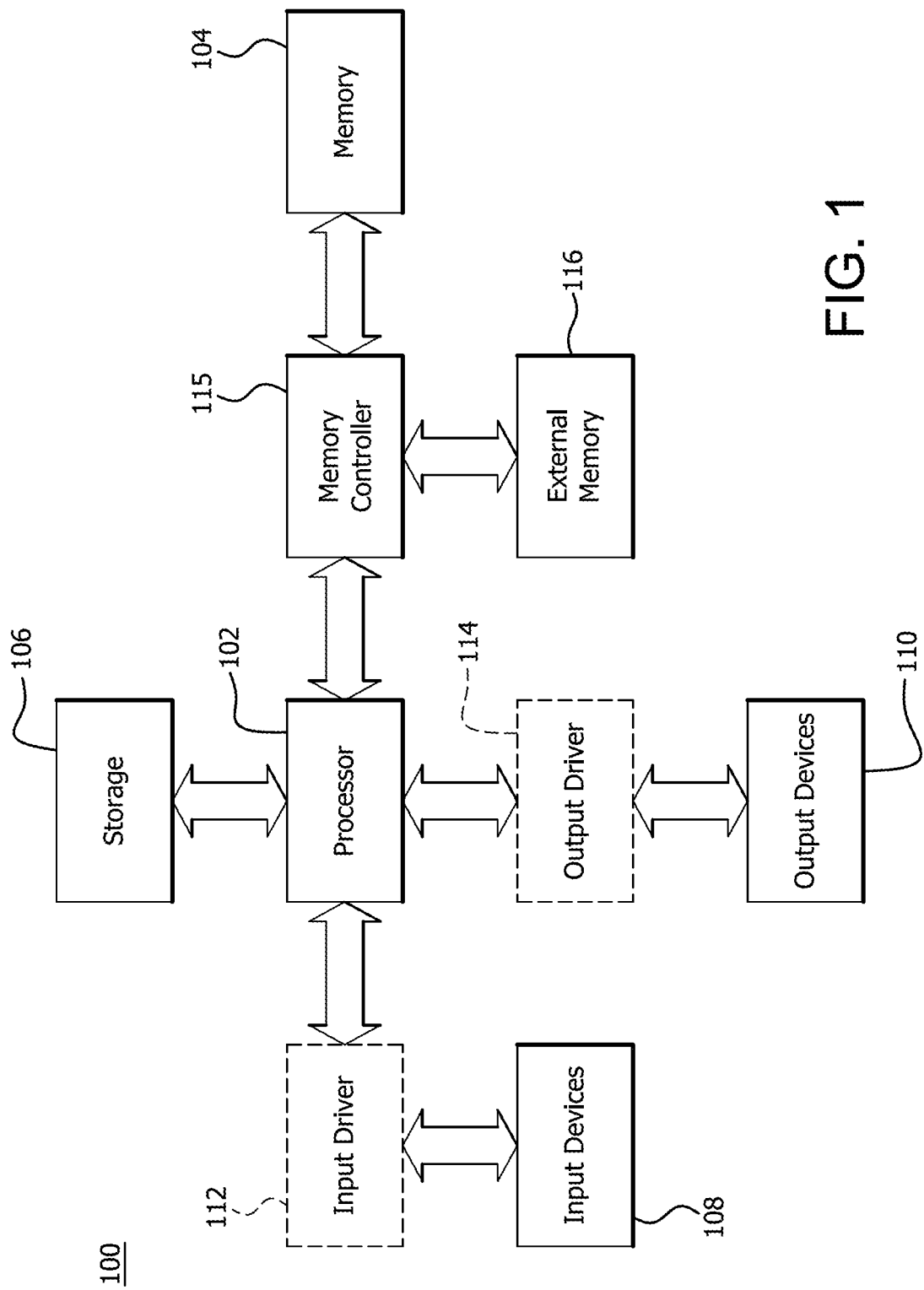
FIG. 1 is a block diagram of an example device in which one or more features of the disclosure can be implemented.

Although the method and apparatus will be expanded upon in further detail below, briefly a mechanism for determining link bifurcation availability is described herein. A PCIe controller may potentially be deployed in a scenario where the required or ideal port configuration is unknown at the time of chip initialization. In such cases, it is possible that the number of PCIe devices physically connected to the PCIe controller (controller) exceeds the number of ports (e.g., lanes) for which the controller (and the rest of the PCIe stack) is currently configured. Multiple add-in cards and/or multiple components instantiated on an add-in card connected to a downstream port that can be bifurcated is an example of such a scenario. For example, multiple disk controllers may be instantiated on an add-in card, or multiple graphics cards may be connected. Furthermore, the possibility exists that the controller can be reconfigured to support the complete set or at least more of the connected devices than are unsupportable in the current configuration. That is, the controller is physically capable of supporting additional ports if properly programmed/configured to do so. Accordingly, herein is described a method and apparatus to identify additional and previously unknown ports that may exist and defines a mechanism (e.g., through a link management feature for managing) to communicate the discovery to software so that it can react and take necessary measures to optimize the PCIe controller.

The mechanism leverages the reception of valid link numbers that are not expected at a specific point in the link training sequence. One port receiving unexpected but valid link numbers on a subset of lanes indicates that it may be connected to more than one device and that a link bifurcation is possible. When these conditions are met, and the feature is enabled, the link controller loads the received link numbers to a per-lane set of registers and generates an interrupt that directs the software to those registers (where it can deduce what the actual configuration should be). At that point, the software has the option to select a more suitable configuration, communication on the links may be continued, but training is not advanced until a new configuration is written. At this point additional link Training and Status State Machines (LTSSMs) may be brought online and synchronized to the same point in the ordered set transmission, with the ports transmitting unexpected link numbers are handed over to those LTSSMs, allowing all ports to proceed with training. A method for determining link bifurcation availability implemented in a computer system includes assigning, by a controller, lanes that include links for one or more components connected in accordance with a current known configuration. The controller transmits ordered sets including the assignments to the one or more components which are received by the one or more components. The one or more components respond with a first link to the controller; and based upon the links received by the controller not meeting the current known configuration, the controller issues an interrupt and is reconfigured.

An apparatus for determining link bifurcation availability implemented in a computer system includes a controller and one or more components communicatively coupled to the controller over a plurality of physical lanes. The controller assigns the lanes that include links for the one or more components connected in accordance with a first configuration and transmits ordered sets including the assignments to the one or more components. The controller receives the ordered sets by the one or more components, and based upon the values received by the controller by the one or more components not meeting the first configuration, issues an interrupt, calculates a second configuration, configures the controller in accordance with the second configuration, and trains the links as indicated by the second configuration.

A non-transitory computer-readable medium for servicing a task in a computer system has instructions recorded thereon, that when executed by the processor, cause the processor to perform operations. The operations include assigning lanes that include links for one or more components connected in accordance with a first configuration. Ordered sets including the assignments to the one or more components are transmitted to the one or more components and received by the one or more components. Based upon the values received by the one or more components not meeting the first configuration, the operations include issuing an interrupt, calculating a second configuration, configuring a controller in accordance with the second configuration, and training the links as indicated by the second configuration.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. Additionally, the device 100 includes a memory controller 115 that communicates with the processor 102 and the memory 104, and also can communicate with an external memory 116. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

The external memory 116 may be similar to the memory 104, and may reside in the form of off-chip memory. Additionally, the external memory may be memory resident in a server where the memory controller 115 communicates over a network interface to access the memory 116.

Figure 2:
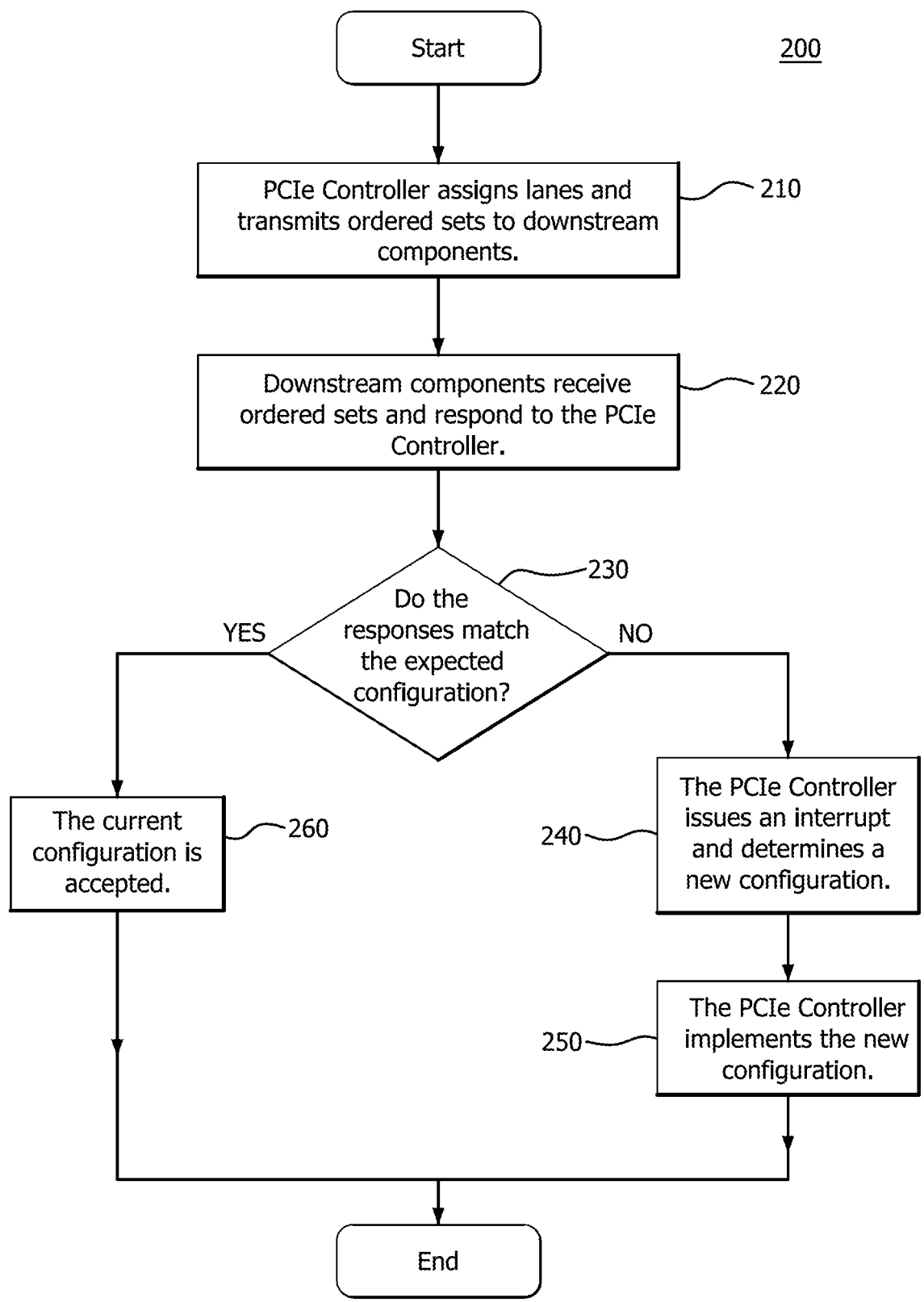
FIG. 2 is a flow diagram of an example method of determining link bifurcation availability.
Figure 3:
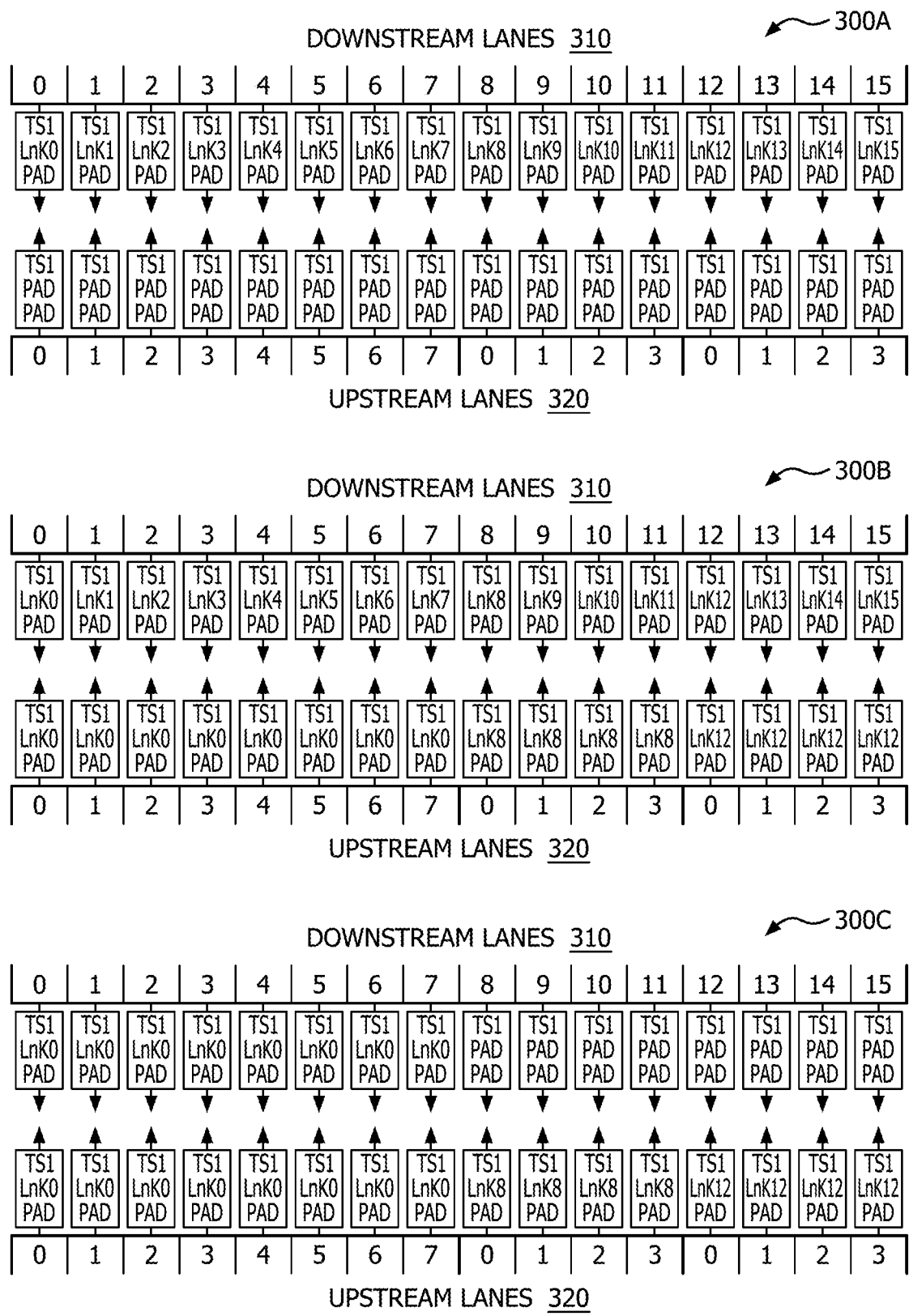
FIG. 3 is a schematic diagram of a link bifurcation determination, according to an example.

FIG. 2 is a flow diagram of an example method 200 of determining link bifurcation availability. FIG. 3 is schematic diagram of a link bifurcation determination, according to an example, based on the method 200 of FIG. 2. In step 210, the PCIe controller assigns lanes and transmits TS1 training sequence (TS1) ordered sets to PCIe components connected based upon an initial configuration known by the PCIe controller. The TS1 ordered sets include information about each lane, including link numbers. Referring now to FIG. 3, step 210 is shown in 300A where the PCIe controller transmits TS1 ordered sets with lane numbers set to PAD and link numbers set to 0-15 to the downstream components on physical lanes 0-15 (310). That is, the PCIe controller transmits TS1/Lnk0 . . . TS1/Lnk15 on physical lanes 0 . . . 15, respectively. As shown in FIG. 3, there are three downstream components connected on upstream lanes 320 (e.g., a first component connected to 8 upstream lanes corresponding to downstream lanes 0-7, a second component connected to 4 upstream lanes (0-3) corresponding to downstream lanes 8-11, and a third component connected to 4 upstream lanes (0-3) corresponding to downstream lanes 12-15). However, in accordance with an example initial configuration, the PCIe controller is expecting a single 16 lane component to be connected.

Each port (e.g., downstream lanes or upstream lanes) has one valid set of registers per physical lane associated with the initial link width. Accordingly, a port that is "n" lanes wide has valid registers for logical lanes "0" to "n−1". Furthermore, as part of the initial configuration (i.e., current configuration), that port is assigned to physical lanes "m" to "m+n−1". Therefore, the lane "0" to lane "n−1" registers for that port represent physical lanes "m" to "m+n−1", respectively. For example, if a PCIe controller is programmed to operate as an 8/4/4 (lanes) and the ports are shifted so that, for example, port A, an 8-lane port, occupies lanes 4 to 11, then port A's lane 0 to lane 7 registers represent physical lanes 4 to 11.

Accordingly, in step 220, the downstream components receive the TS1 ordered sets and each downstream component responds with TS1 ordered sets advertising the same link number on all lanes associated with it to the upstream component PCIe controller. The link number advertised by each downstream component must be one of the link numbers received from the upstream component.

The PCIe controller then determines if the responses match the expected configuration (step 230). If the responses match the expected configuration in step 230, then the method proceeds to step 260, where the current configuration is accepted and the links are trained up in accordance with the expected configuration. For example, in 300A, the expected configuration in accordance with the example initial configuration is one 16 lane device connected on lanes 0-15.

If the responses do not match the expected configuration (step 230), then the PCIe controller issues an interrupt and software/firmware determines a new configuration (step 240). Referring again to FIG. 3, in 300B, the first component responds with link0 on all 8 upstream lanes it is connected to, the second component responds with link8 on all 4 upstream lanes it is connected to, and the third component responds with link 12 on all 4 upstream lanes it is connected to. That is, each component chooses a link number from the link numbers received on the lanes it is connected to and responds with that link number. Accordingly, the first component received TS1 ordered sets that included link numbers 0-7, and responds with, for example, link number 0, which in this example is the lowest link received by the first component. The second component received TS1 ordered sets that include link numbers 8-11, and responds with, for example, link number 8, which in this example is the lowest link received by the second component. The third component received TS1 ordered sets that includes link numbers 12-15, and responds with, for example, link number 12, which in this example is the lowest link received by the third component. It should be noted that any link number received by the component may be utilized by the component in its response.

In this case, the PCIe controller has received information that does not correspond to the current configuration information it has. The expectation in this example is that there is one 16 lane device connected to 16 lanes, and the PCIe controller is receiving information that there are 3 connected components (one being connected to 8 lanes, and 2 being connected to 4 lanes each). Accordingly, the PCIe controller issues the interrupt and makes available information indicating the actual configuration such that the software servicing that interrupt is able to interrogate it and determine the optimum configuration (e.g., using the link management feature or an onboard microcontroller (not shown)).

In step 250, the PCIe controller implements the new configuration. For example, referring again to FIG. 3, 300C shows that downstream lanes 0-7 are assigned link0 in accordance with the response from the first component while lanes 8-15 are not utilized.

From this point forward, the link trains as it normally would and it is in the domain of the software, after servicing the interrupt, to determine whether it must engage and take the necessary steps to bifurcate the link. For example, once it is determined to bifurcate the link, the new configuration is determined. Referring to the example shown in FIG. 3, lanes 0-7 are configured for the first component as an 8 lane component, lanes 8-11 are configured for the second component as a 4 lane component, and lanes 12-15 are configured for the third component as a 4 lane component.

Once the new configuration is programmed, link training may proceed or the controller may be reset and link training may begin a new utilizing the new configuration. This new configuration may therefore be a more optimized configuration in that it takes into account the actual components that are connected to the PCIe bus for link training and the like.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure. Further, although the methods and apparatus described above are described in the context of controlling and configuring PCIe links and ports, the methods and apparatus may be utilized in any interconnect protocol where link width is negotiated.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). For example, the methods described above may be implemented in the processor 102 or on any other processor in the computer system 100.

What is claimed is:

1. A method for determining link bifurcation availability implemented in a computer system, comprising:
   assigning, by a controller, lanes that include links for one or more components connected in accordance with a first configuration;
   transmitting ordered sets including the assignments to the one or more components;
   receiving the ordered sets by the one or more components; and
   based upon the values received by the controller by the one or more components not meeting the first configuration, wherein a first set of values is received from a first component and a second set of values is received from a second component, the first set of values including a first link number selected from the ordered set received by the first component that is a lowest link number of the ordered set received by the first component and the second set of values including a second link number selected from the ordered set received by the second component that is a lowest link number of the ordered set received by the second component:
   issuing an interrupt;
   calculating a second configuration;
   configuring the controller in accordance with the second configuration; and
   training the links as indicated by the second configuration, wherein the training of the links includes training a first set of links for the first component and a second set of links for the second component.

2. The method of claim 1, wherein the first configuration is an initial configuration based upon an expected number of components.

3. The method of claim 1, wherein the ordered sets are training sequences that include information about each lane.

4. The method of claim 3, wherein the transmitting the ordered sets includes transmitting the training sequences over the lanes.

5. The method of claim 1, further comprising the one or more components transmitting a first link to the controller upon receiving the ordered sets as the values.

6. The method of claim 5, wherein the first link number is a number chosen from the link numbers received by each component of the one or more components.

7. The method of claim 1, wherein upon receiving the values not meeting the first configuration, sending, by the controller, information via a link management feature for calculation of the second configuration.

8. The method of claim 7, wherein the second configuration is an optimized configuration for link training.

9. The method of claim 8, wherein the calculating the second configuration includes assigning lanes that include the links for a first component of the one or more components.

10. The method of claim 9, wherein the calculating the second configuration includes assigning lanes that include links for a second component of the one or more components.

11. The method of claim 1, wherein the lanes are Peripheral Component Interconnect Express (PCIe) lanes.

12. An apparatus for determining link bifurcation availability implemented in a computer system, comprising:
    a controller; and
    one or more components communicatively coupled to the controller over a plurality of physical lanes;
    wherein the controller:
    assigns the lanes that include links for the one or more components connected in accordance with a first configuration;
    transmits ordered sets including the assignments to the one or more components;
    receives the ordered sets by the one or more components, wherein a first set of values is received from a first component and a second set of values is received from a second component, the first set of values including a first link number selected from the ordered set received by the first component that is a lowest link number of the ordered set received by the first component and the second set of values including a second link number selected from the ordered set received by the second component that is a lowest link number of the ordered set received by the second component; and
    based upon the values received by the controller by the one or more components not meeting the first configuration:

issues an interrupt;
calculates a second configuration;
configures the controller in accordance with the second configuration; and
trains the links as indicated by the second configuration, wherein the controller trains a first set of links for the first component and a second set of links for the second component.

13. The apparatus of claim 12, wherein the first configuration is an initial configuration based upon an expected number of components.

14. The apparatus of claim 12, wherein the ordered sets are training sequences that include information about each lane.

15. The apparatus of claim 14, wherein the transmitting the ordered sets includes transmitting the training sequences over the lanes.

16. The apparatus of claim 12, further comprising the one or more components transmitting a first link to the controller upon receiving the ordered sets as the values.

17. The apparatus of claim 16, wherein the first link number is a number chosen from the link numbers received by each component of the one or more components.

18. The apparatus of claim 12, wherein upon receiving the values not meeting the first configuration, the controller sends information via a link management feature for calculation of the second configuration.

19. The apparatus of claim 18, wherein the second configuration is an optimized configuration for link training.

20. The apparatus of claim 19, wherein the calculating the second configuration includes assigning lanes that include the links for a first component of the one or more components.

21. The apparatus of claim 20, wherein the calculating the second configuration includes assigning lanes that include links for a second component of the one or more components.

22. The apparatus of claim 12, wherein the lanes are Peripheral Component Interconnect Express (PCIe) lanes.

23. The apparatus of claim 12, wherein the one or more components are Peripheral Component Interconnect Express (PCIe) components.

24. A non-transitory computer-readable medium for servicing a task in a computer system, the non-transitory computer-readable medium having instructions recorded thereon, that when executed by the processor, cause the processor to perform operations including:
assigning lanes that include links for one or more components connected in accordance with a first configuration;
transmitting ordered sets including the assignments to the one or more components;
receiving the ordered sets by the one or more components, wherein a first set of values is received from a first component and a second set of values is received from a second component, the first set of values including a first link number selected from the ordered set received by the first component that is a lowest link number of the ordered set received by the first component and the second set of values including a second link number selected from the ordered set received by the second component that is a lowest link number of the ordered set received by the second component; and
based upon the values received by the one or more components not meeting the first configuration:
issuing an interrupt;
calculating a second configuration;
configuring a controller in accordance with the second configuration; and
training the links as indicated by the second configuration, wherein the training of the links includes training a first set of links for the first component and a second set of links for the second component.

* * * * *